April 13, 1965 S. ROSIN ET AL 3,178,510

DIMENSION MEASURING AND COMPARING ARRANGEMENT

Filed Oct. 11, 1961 5 Sheets-Sheet 1

INVENTORS
Seymour Rosin
Charles D. Bryant
BY
Michael S. Striker
Attorney

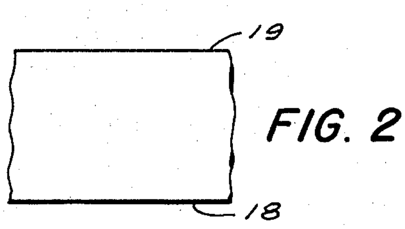
FIG. 2
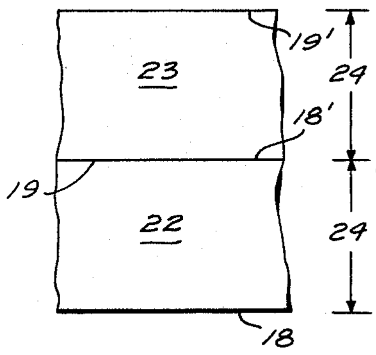
FIG. 3a
FIG. 3b
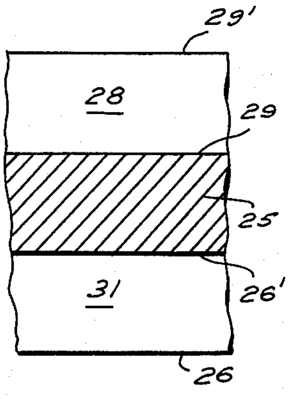
FIG. 4a
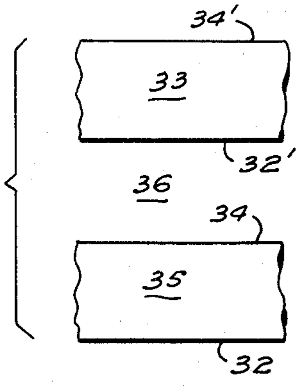
FIG. 5a
FIG. 4b
FIG. 5b
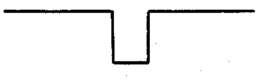
INVENTORS
Seymour Rosin
Charles D. Bryant
BY
Michael S. Striker
Attorney

DIMENSION MEASURING AND COMPARING ARRANGEMENT

Filed Oct. 11, 1961 5 Sheets-Sheet 3

INVENTORS
Seymour Rosin
Charles D. Bryant
BY
Michael S. Striker
Attorney

DIMENSION MEASURING AND COMPARING ARRANGEMENT

Filed Oct. 11, 1961 5 Sheets-Sheet 4

INVENTORS
Seymour Rosin
Charles D. Bryant
BY
Michael S. Striker

INVENTORS
Seymour Rosin
Charles D. Bryant
BY
by: Michael S. Striker
Attorney

United States Patent Office 3,178,510

Patented Apr. 13, 1965

3,178,510

DIMENSION MEASURING AND COMPARING ARRANGEMENT

Seymour Rosin, Massapequa Park, and Charles D. Bryant, Brooklyn, N.Y., assignors to Grimson Color Inc., Long Island, N.Y.

Filed Oct. 11, 1961, Ser. No. 144,402
6 Claims. (Cl. 178—6.8)

The present invention relates to a dimension measuring and comparing arrangement. More particularly, the present invention relates to a dimension measuring and comparing arrangement for measuring a selected linear dimension of an object and for comparing the selected linear dimension of the object with a desired reference dimension.

The principal object of the present invention is to provide a new and improved dimension measuring and comparing arrangement for measuring a selected linear dimension of an object and for comparing the selected linear dimension of the object with a desired reference dimension.

An object of the present invention is to provide a dimension measuring and comparing arrangement for measuring a selected linear dimension of an object with accuracy and dependability.

An object of the present invention is to provide a dimension measuring and comparing arrangement for comparing a selected linear dimension of an object with a desired reference dimension with accuracy and dependability.

An object of the present invention is to provide a dimension measuring and comparing arrangement for measuring a selected linear dimension of an object which is not readily accessible to a human being.

An object of the present invention is to provide a dimension measuring and comparing arrangement for comparing a selected linear dimension of an object which is not readily accessible to a human being with a desired reference dimension.

An object of the present invention is to provide a dimension measuring and comparing arrangement for measuring the diameter of an object with accuracy and dependability.

An object of the present invention is to provide a dimension measuring and comparing arrangement for comparing the diameter of an object with a desired reference diameter with accuracy and dependability.

An object of the present invention is to provide a dimension measuring and comparing arrangement for measuring the width of an object with accuracy and dependability.

An object of the present invention is to provide a dimension measuring and comparing arrangement for measuring a selected linear dimension of an object and for comparing the selected linear dimension of the object with a desired reference dimension, which arrangement utilizes a television camera and television monitor to permit such measurement and comparison at great distances.

Another object of the present invention is to provide a dimension measuring and comparing arrangement for measuring a selected linear dimension of an object and for comparing the selected linear dimension of the object with a desired reference dimension, which arrangement is of relatively simple structure and therefore economical in manufacture.

Still another object of the present invention is to provide a dimension measuring and comparing arrangement utilizing a television camera and television monitor and requiring no fixed reference point or line on the television monitor.

In accordance with the present invention, a dimension measuring and comprising arrangement for measuring a selected linear dimension of an object and for comparing the selected linear dimension of the object with a desired reference dimension comprises, in combination, a television camera positoned in operative proximity to an object and adapted to produce a camera output signal. A television monitor having a viewing screen is connected to the camera in a manner whereby the camera output signal of the camera is supplied to the monitor and the image of an object seen by the camera is provided on the viewing screen of the monitor. A first image of the object is provided on the viewing screen of the monitor and a second image of the object is provided on the viewing screen of the monitor in a predetermined relation to the first image. When the selected linear dimension of the object is equal to the desired reference length, a first condition is indicated on the viewing screen of the monitor by the relationship of the first and second images to each other, when the selected linear dimension of the object is greater than the desired reference length a second condition is indicated on the viewing screen of the monitor by the relationship of the first and second images to each other, and when the selected linear dimension of the object is less than the desired reference length a third condition is indicated on the viewing screen of the monitor by the relationship of the first and second images to each other. The indication of each of the second and third conditions corresponds to the extent of deviation of the selected linear dimension of the object from the desired reference length. The camera output signal of the television camera includes a blanking pulse and a control pulse and the width or duration of the control pulse of the camera output signal indicates the extent of deviation of the selected linear dimension of the object from the desired reference length.

An indicator converts the control pulse of the camera output signal to an indication of the extent of deviation of the selected linear dimension of the object from the desired reference length, the camera output signal being supplied to the indicator. Thus, a visual indication of deviation of the selected linear dimension of the object from the desired reference length is presented on the viewing screen of the monitor and a meter indication of the deviation of the selected linear dimension of the object from the desired reference length is presented by the indicator. The indication of deviation may be recorded on a recorder connected to the output of the indicator.

In order that the present invention may be readily carried into effect, it will now be described with reference to the accompanying drawings, wherein:

FIG. 2 is an illustration of the first and second images of the object on the monitor screen prior to the initiation of the measuring and comparing operation of the dimension measuring and comparing arrangement of the present invention;

Figure 1:
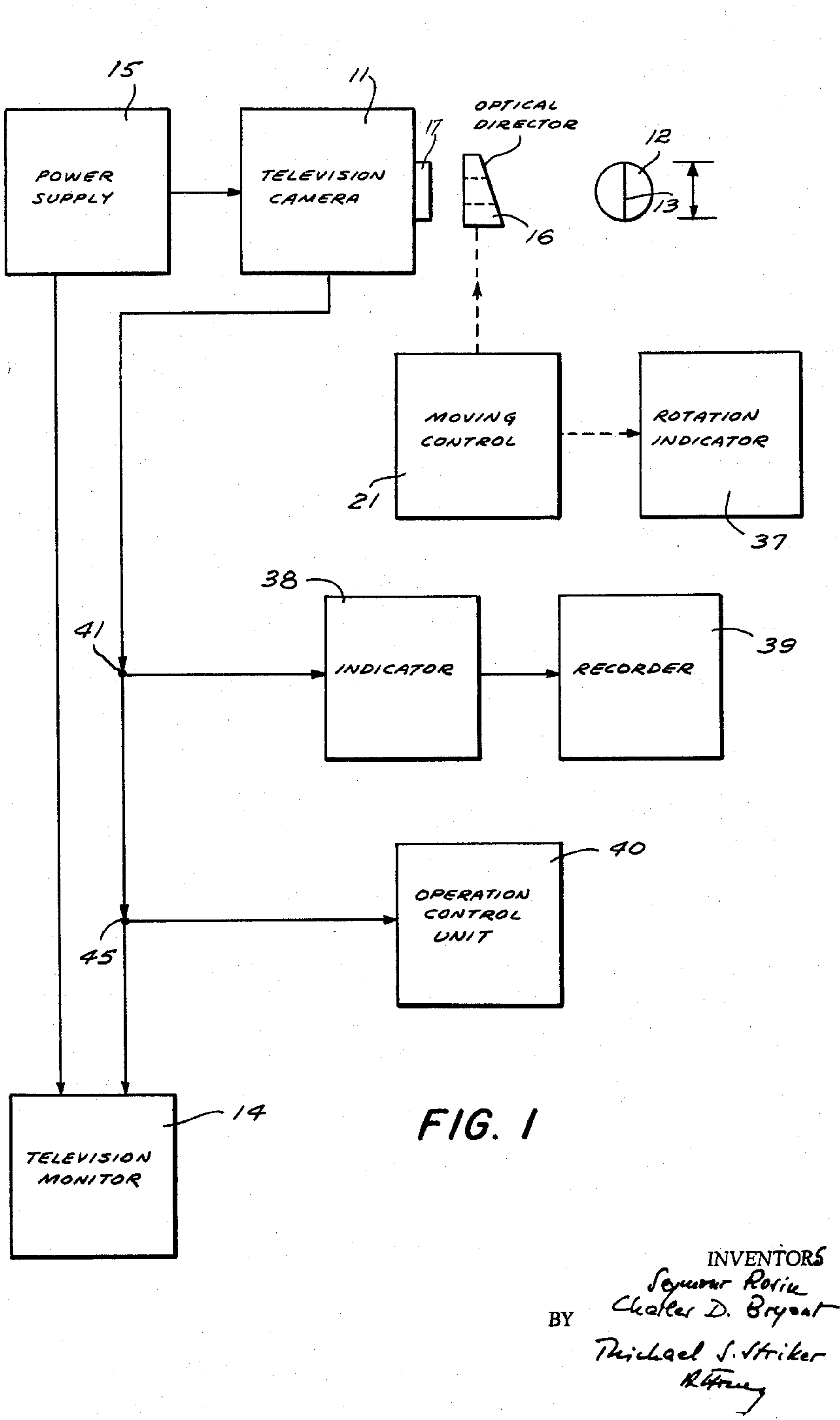
FIG. 1 is a schematic block diagram of an embodiment of the dimension measuring and comparing arrangement of the present invention.
Figure 6:
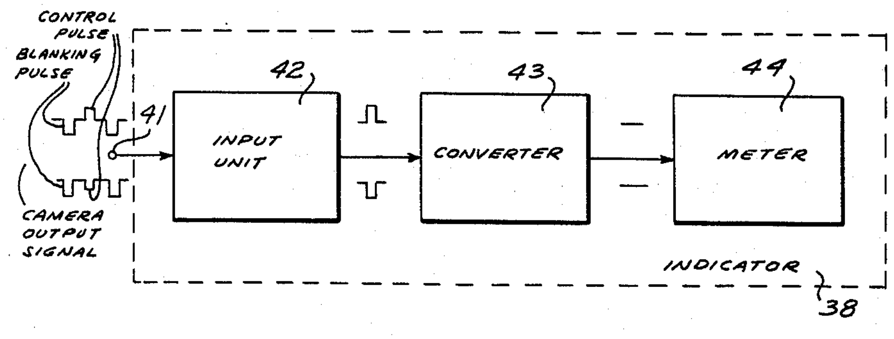
Figure 7:
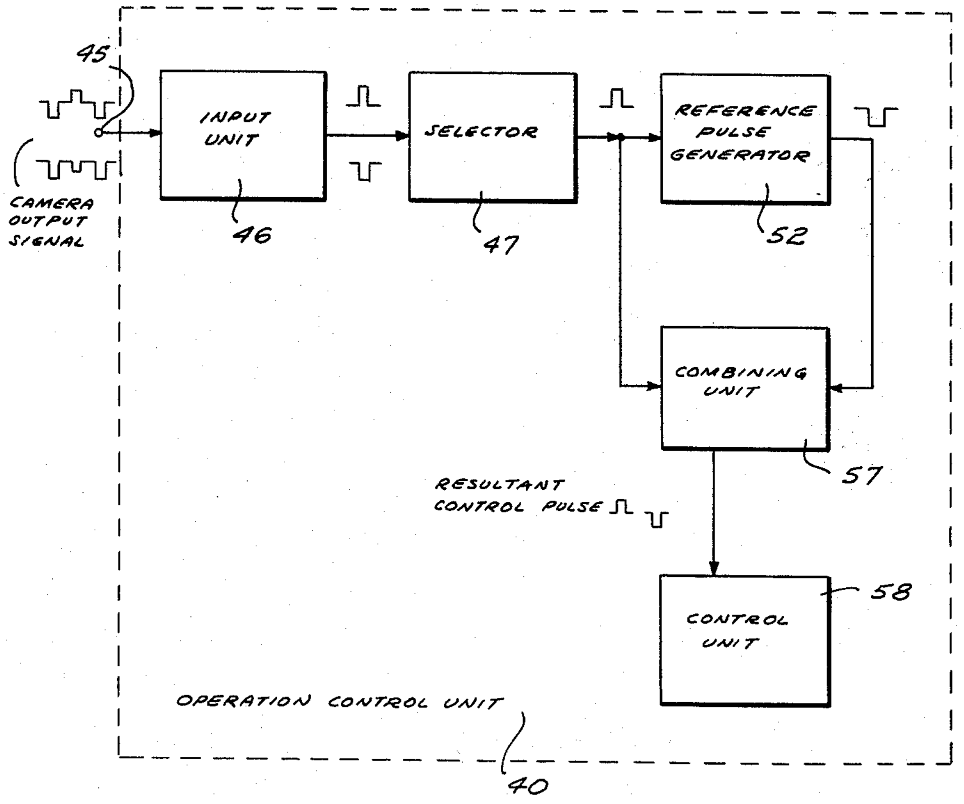
Figure 8:
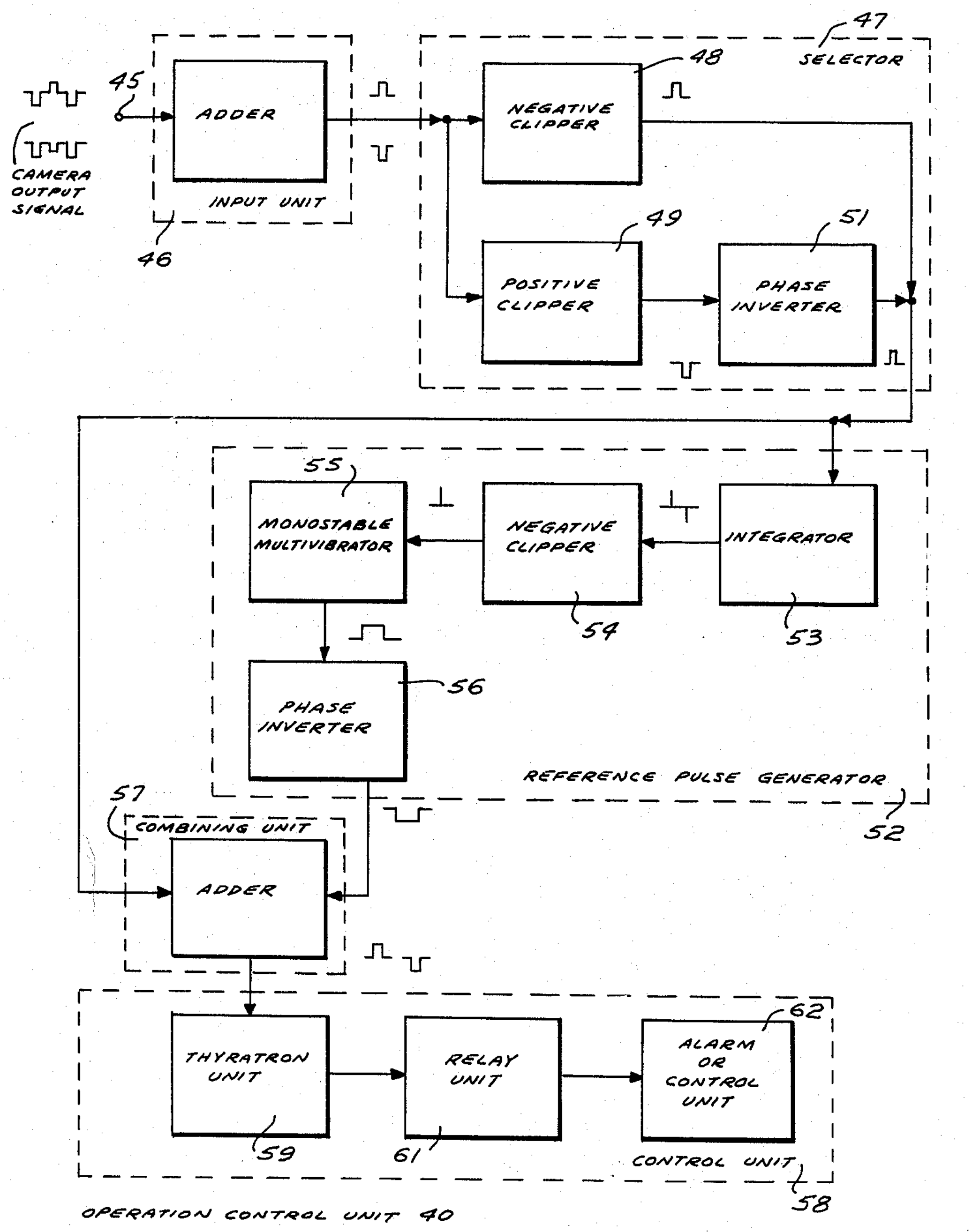
Figure 9:
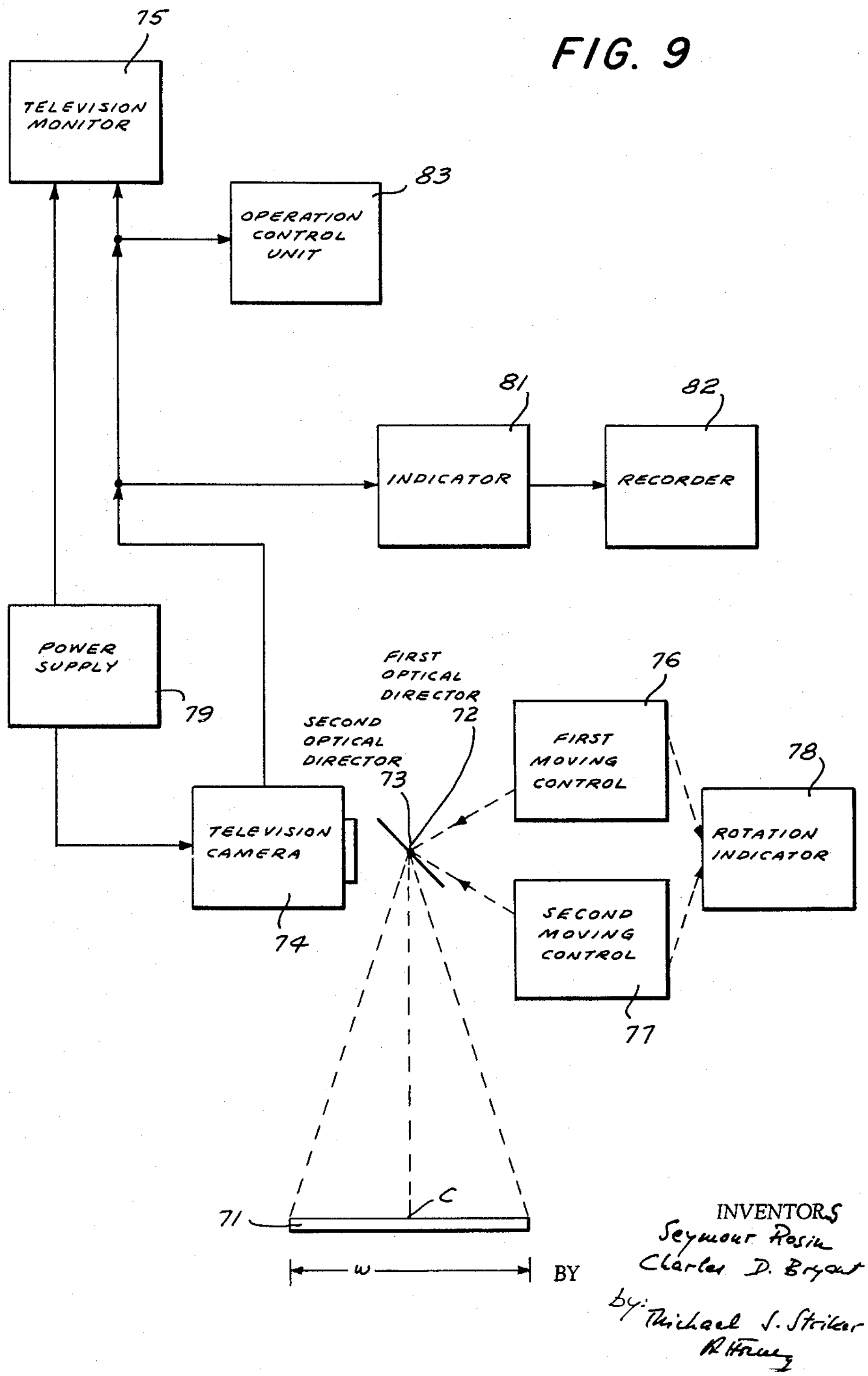

FIG. 3*a* is an illustration of the first and second images of the object on the monitor screen when the measured dimension of the object is equal to the desired reference length;

FIG. 3*b* is an illustration of the control signal produced by the camera when the measured dimension of the object is equal to the desired reference length;

FIG. 4*a* is an illustration of the first and second images of the object on the monitor screen when the measured dimension of the object is greater than the desired reference length;

FIG. 4*b* is an illustration of the control signal produced by the camera when the measured dimension of the object is greater than the desired reference length;

FIG. 5*a* is an illustration of the first and second images of the object on the monitor screen when the measured dimension of the object is less than the desired reference length;

FIG. 5*b* is an illustration of the control signal produced by the camera when the measured dimension of the object is less than the desired reference length;

FIG. 6 is a schematic block diagram of an embodiment of an indicator which may be utilized in the embodiment of FIG. 1;

FIG. 7 is a schematic block diagram of an embodiment of an operation control which may be utilized in the embodiment of FIG. 1;

FIG. 8 is a schematic block diagram in greater detail of the operation control of FIG. 7; and FIG. 9 is a schematic block diagram of another embodiment of the dimension measuring arrangement of the present invention.

In FIG. 1, a television camera 11 is positioned in operative proximity with an object 12 having a dimension which is to be measured by the arrangement of FIG. 1. The selected linear dimension of the object 12 to be measured may comprise, for example, the diameter 13 thereof. The camera 11 is connected to a television monitor 14. The television monitor 14 has a viewing screen and is connected to the camera 11 in a manner whereby the camera output signal of the camera is supplied to the monitor and the image of an object seen by the camera is provided on the viewing screen of said monitor. The television camera 11 produces a camera output signal including a blanking pulse and a control pulse (seen at the input terminals of FIGS. 6, 7 and 8).

A power supply 15 is connected to the television camera 11 and to the television monitor 14 to energize said camera and said monitor and thereby enable their operation in the manner described. The power supply 15, the camera 11 and the monitor 14 may comprise any suitable equipment known in the art and comprise standard items. An optical director 16 is positioned adjacent the lens portion 17 of the television camera 11 in a manner whereby the optical director directs into the camera lens 17, and thereby into the camera 11, a first image of the object 12 and also directs into the camera a second image of the object 12.

In the case of the object 12, it is desired to measure the diameter 13, which is the selected linear dimension of said object. It is assumed that the object 12 is an elongated object such as, for example, a tube, pipe or cable, having a circular cross-sectional area. The circuit arrangement of FIG. 1 is adapted to indicate any variation between a desired or preset selected diameter 13 and any measured diameter of the object 12. That is, the arrangement of FIG. 1 may be utilized to control the diameter or other selected linear dimension of the object 12 in accordance with a desired reference length varying between preselected limits.

Prior to the initiation of the measuring and comparing operation of the dimension measuring and comparing arrangement of the present invention, the first and second images of the object 12 are superimposed, as shown in FIG. 2. The presentation of the monitor screen is thus a single image of the object 12 having a lower edge 18 and an upper edge 19. The image is shown as a segment of the length of the object 12 because said object is an elongated tube, pipe or cable, for example, and the side view thereof forming the image seen by the camera 11 is only a portion of its length.

In operation, the optical director 16 provides two images of the object 12, as seen in FIGS. 3*a*, 3*b*, 4*a*, 4*b*, 5*a* and 5*b*. The first image of the object 12 is shown in the initial pre-operative position of the superimposed first and second images, as shown in FIG. 2. The optical director 16 directs the image of the object 12 into the camera

11 and therefore provides on the monitor viewing screen an image of the object 12 in the initial position wherein the first and second images of said object are superimposed upon each other. The optical director 16 is then rotated by a moving control 21 to move the second image of the object 12 out of its superimposed initial position on the monitor viewing screen to a position wherein the lower edge 18' of the second image, formerly superimposed upon the lower edge 18 of the first image is moved to the area of the upper edge 19 of the first image. That is, the rotation of the optical director 16 by the moving control 21 causes the rotation of the image of the object 12 on the monitor screen and such rotation is continued until the second image of the object 12 is moved from the initial superimposed position to a position in relation to the first image as shown in FIG. 3*a*.

In FIG. 3*a*, the first image 22 of the object 12 is shown in its initial superimposed position. The second image 23 of the object 12 is shown with the lower edge 18' thereof superimposed upon the upper edge 19 of the first image 22. It is thus seen that in the case of FIG. 3*a*, wherein the diameter 24 of the images 22 and 23 corresponds to a diameter 13 equal to the desired diameter value or the selected reference length of the diameter 13, the lower edge 18' of the second image 23 coincides with the upper edge 19 of the first image 22.

In FIG. 3*a*, the camera 11 provides a control signal shown in FIG. 3*b*, which control signal is a substantially direct voltage indicating coincidence between the measured and the desired diameter length. The control signal provided by equality between the measured diameter of the object and the desired reference length of said diameter is indicated on the viewing screen of the monitor as a straight coincidence line comprising the lower edge 18' of the second image and the upper edge 19 of the first image, as shown in FIG. 3*b*.

In the event that the diameter of the object increases and becomes greater than the desired reference length of such diameter, or in the event that a second object is measured and the diameter of the second object is greater than the desired reference length of such diameter, the first and second images will overlap as shown in FIG. 4*a*. Due to the positioning of the first and second images, the magnitude of overlap indicated on the monitor screen is twice the magnitude of the variation between the measured diameter and the desired reference length of said diameter. That is, the lower edge 26' of the second image 28 is positioned intermediate the lower edge 26 and the upper edge 29 of the first image 31 and the upper edge 29 of the first image 31 is positioned intermediate the lower edge 26' and the upper edge 29' of the second image. In the event that the diameter of the object increases and is greater than the desired diameter length, or diameter value, the control signal produced by the camera 11 is a positive pulse, as shown in FIG. 4*b*. The positive control pulse produced by the camera provides on the viewing screen of the monitor 14 a strip of substantially light hue which appears as shown in FIG. 4*a*. The width or diameter of the positive control pulse shown in FIG. 4*b* and the width of the overlap band 25, shown in FIG. 4*a*, corresponds to the extent of the variation between the measured and the desired diameter or, more specifically to the amount that the length of the measured diameter exceeds the desired reference length of the diameter.

When the dimension of the diameter of the measured object is less than the desired reference length of the diameter, the first and second images are spaced from each other in the manner shown in FIG. 5*a*. The first and second images are in position with the lower edge 32' of the second image 33 spaced from the upper edge 34 of the first image 35; the first and second images being spaced from each other. Due to the positioning of the first and second images, the magnitude of underlap indicated on the monitor screen or the spacing of the first and second images from each other is a distance corresponding to twice the magnitude of the variation between the measured diameter and the desired reference length of said diameter. That is, the lower edge 32′ of the second image 33 is positioned in spaced relation from the upper edge 34 of the first image 35.

In the event that the measured diameter is less than the desired diameter length, the camera 11 produces a control signal which is a negative pulse, as shown in FIG. 5*b*. The negative control pulse is supplied to the monitor 14 and produces on the viewing screen thereof an underlap band 36, shown in FIG. 5*a*. The underlap band 36 is of substantially dark hue, such as, for example, black. The width or duration of the negative control pulse and the width of the underlap band 36, as in the case of the overlap band, corresponds to the extent of the variation between the measured and the desired diameter or, more specifically, to the amount that the length of the measured diameter is less than the desired reference length of the diameter.

It is thus seen that a great advantage of the arrangement of the present invention is the elimination of a fixed reference line on the monitor screen. The coincidence line, overlap band or underlap band remains with the first and second images although these images may move because it is these images themselves which form such line or band. This is highly advantageous because when the object is moving at high speed the images tend to move on the screen.

The operation of the arrangement of FIG. 1 is not limited to the measurement of the diameter but may be utilized to measure any selected linear dimension of an object. The arrangement of FIG. 1 operates to provide an indication or an operation control in accordance with such measurement and also provides a direct indication of the desired diameter. Thus, the arrangement of FIG. 1 operates through the moving control 21 to provide a direct indication of the magnitude of a selected linear dimension such as, for example, the diameter 13 of the object 12, by means of a rotation indicator 37 coupled thereto. The arrangement of FIG. 1 also functions to provide a record of any deviation of a measured linear dimension, such as, for example, the diameter 13 of the object 12, from a desired reference length or magnitude by means of an indicator 38. The indication of the indicator 38 may be recorded if desired by means of a recorder 39 connected to the output of said indicator. The arrangement of FIG. 1 also functions to provide an automatic control operation in accordance with the extent of deviation between a measured linear dimension of the object 12, such as, for example, the diameter 13 thereof, and a desired reference length or magnitude by means of an operation control unit 40.

The moving control 21 is mechanically coupled to the optical director 16 in a manner whereby said moving control rotates said optical director. The moving control 21 may comprise any suitable means for rotating the optical director 16, such as, for example, a motor and suitable gear coupling between the motor and said optical director. The moving control 21 is coupled to a rotation indicator 37 which may comprise any suitable means for indicating the degree or magnitude of rotation of said moving control thereby indicating the degree or magnitude of rotation of the optical director 16. Thus, for example, the rotation indicator 37 may merely indicate the number of revolutions of the shaft or coupling connection between the moving control 21 and the optical director 16, the number of revolutions of said coupling connection being equated to indicate the degree or magnitude of rotation of said optical director. The moving means 21, rotates the optical director 16 in the aforementioned manner to provide the second image of the object on the viewing screen of the monitor.

The rotation indicator 37, by indicating the amount of rotation of the optical director 16 between the provision of the first and second images of the object on the viewing screen of the monitor, indicates the amount of rotation of said optical director and thereby indicates the length of the selected linear dimension, such as, for example, the diameter 13 of the object 12. That is, the amount of rotation of the optical director 16 corresponds to the length of the selected linear dimension, such as, for example, the diameter 13 of the object 12. This is due to the fact that the image of the object is rotated to a point whereby the lower edge of the second image coincides with the upper edge of the first image on the viewing screen of the monitor, so that the amount of rotation of the image to attain the position of the second image, as indicated, corresponds to the magnitude or length of the selected linear dimension of the object 12.

The control signal produced by the television camera 11 is supplied to the indicator 38 which converts the control pulse of the camera output signal to an indication of the extent of deviation of the selected linear dimension of the object 12 from the desired reference length; the present example being concerned with the diameter 13 of said object 12. A suitable indicator 38 which may be utilized in the embodiment of FIG. 1 is shown in FIG. 6.

In FIG. 6, the camera output signal, which comprises blanking pulses and a control pulse, as shown at the input terminal 41, is supplied to an input unit 42. The input unit 42 is connected to the camera 11 through the input terminal 41 and functions to suppress the blanking pulse of the camera output signal and to pass the control pulse of said camera output signal by any suitable means known in the art, such as, for example, by the addition of positive pulses corresponding in phase and magnitude to the blanking pulses thereby to suppress said blanking pulses. The output of the input unit 42 is thus merely the control pulse of the camera output signal as originally supplied to the input terminal 41. The control pulse provided by the input unit 42 is then supplied to a converter 43 which functions to convert the control pulse passed by the input unit 42 into an output voltage having a magnitude corresponding to the width or duration of said control pulse and therefore corresponding to the extent of the deviation of the selected linear dimension of the object 12 from the desired reference length. The output voltage of the converter 43 has a polarity indicating the direction of the deviation of the selected linear dimension of the object from the desired reference length. This is due to the fact that the width or duration of the initial control pulse produced by the camera 11 corresponds to the extent of deviation of the measured linear dimension or diameter from the desired reference length or desired diameter. That is, in the present example, when the measured diameter is equal to the desired length of diameter there is no control pulse produced by the camera 11. As the measured diameter varies from the desired length of diameter, a control pulse is produced by the camera which increases in width or duration as the extent of deviation increases. The polarity of the control pulse is positive when the measured diameter is greater than the desired diameter and negative when the measured diameter is less than the desired diameter.

The converter 43 may comprise any suitable means for converting the positive or negative control pulse passed by the input unit 42 to a voltage having an amplitude corresponding to the width or duration of such pulse. Thus, any suitable electronic circuitry may be utilized for the converter 43. A suitable pulse width to amplitude converter may comprise the 300 millimicrosecond pulse width to pulse height converter manufactured by the Eldorado Electronics Co. of Berkeley, California, and identified as their model TH–300. The output of the converter 43 is a substantially direct voltage having a magnitude which is directly proportional to the width or duration time of the control pulse supplied thereto. The output voltage of the converter 43 is supplied to a meter 44 connected thereto, which meter may comprise any suitable meter arrangement for indicating the magnitude and polarity of said output voltage and therefore indicating the extent and direction of the deviation of the selected linear dimension of the object from the desired reference length.

A suitable meter 44 may comprise a zero center meter of a type which indicates the magnitude of a direct voltage supplied thereto, said magnitude being indicated on either side of a zero or reference line which separates the negative deviation from the positive deviation, so that the position of the indicator dial or needle on either side of the reference line would indicate the direction of deviation and the distance of the needle from the reference line indicates the magnitude of the deviation. The output of the meter 44 may be supplied to a suitable recorder 39 which may comprise any suitable known recorder for recording the result of the readings of the meter 44, thus providing a record of such readings.

A suitable operation control unit 40 which may be utilized in the embodiment of FIG. 1 is shown in FIG. 7, which is a schematic block diagram of an embodiment of such an operation control unit, and in FIG. 8 which is a schematic block diagram in more specific detail of the arrangement of FIG. 7. FIG. 8 discloses the individual blocks of FIG. 7 in more detail. The operation control unit 40 functions to convert the control pulses of the camera output signal to an operation control in accordance with the extent and direction of deviation of the selected linear dimension of the object from the desired reference length. The camera output signal is supplied to the operation control unit 40 through the input terminal 45 thereof.

The operation control unit 40 comprises an input unit 46 which is identical with the input unit 42 of the indicator arrangement of FIG. 6. The output of the input unit 46, which comprises the control pulse of the camera output signal, is supplied to a selector 47 which is connected to said input unit and functions to convert the control pulse passed by said input unit into a positive output pulse having the same width or duration as the control pulse of the camera output signal. The selector 47 may comprise any suitable known electronic circuitry, such as, for example, suitable clippers and/or inverters for converting an input control pulse of either polarity into a positive output pulse. Thus, for example, in the arrangement of FIG. 8, a suitable selector 47 may comprise a negative clipper 48, which eliminates the negative control pulse supplied thereto and provides a positive pulse, and a positive clipper 49 which eliminates the positive pulse and provides a negative pulse. The negative pulse is then fed to a phase inverter 51 which inverts the phase of the negative pulse provided by the positive clipper to provide a positive pulse which is then fed to a reference pulse generator 52.

The reference pulse generator 52 is connected to the selector 47 and functions to provide a negative reference pulse having a width or pulse duration corresponding to selected desired limits of the selected linear dimensions of the object. That is, in accordance with the adjustment of the reference pulse generator 52, said reference pulse generator functions to indicate the limits or extent of permissible deviation in the contemplated control operation. Thus, for example, if the desired diameter of an object is to be 108½ inches, then the limitations or permissible extent of variation imposed upon the arrangement by adjustment of the reference pulse generator 52 may vary, for example, from 108¼ inches to 108¾ inches.

The reference pulse generator 52 may comprise any suitable means known in the art for converting the positive pulse fed into said reference pulse generator to a negative pulse which may be utilized as a reference pulse in that it includes the permissible variation limits to be utilized in the function of the arrangement of the present invention. Thus, for example, the reference pulse generator 52 of FIG. 8 utilizes an integrator 53 which is connected to the output of the negative clipper 48 and the phase inverter 51 of the selector 47 and serves to narrow down the positive pulse supplied thereto by said selector into sharp positive and negative spikes which are then fed to a negative clipper 54 which functions to eliminate the negative spike and pass only the positive spike which is then fed to a monostable multivibrator 55.

The monostable multivibrator 55 includes adjusting means for adjusting said multivibrator, to produce a reference pulse having a width or pulse duration corresponding to the desired limits or the permissible extent of variation of the selected linear dimension of the object. The positive pulse produced by the monostable multivibrator 55 is supplied to a phase inverter 56 which inverts the polarity of said positive input pulse to a negative polarity reference pulse which is then fed to one input of a combining unit 57. Each of the integrator 53, the negative clipper 54, the monostable multivibrator 55 and the phase inverter 56 comprises a circuit known in the art which functions to perform the operation indicated as performed thereby.

The initial positive control pulse provided by the selector 47 is supplied to one input of the combining unit 57 and the negative reference pulse from the phase inverter 56 of the reference pulse generator 52, which has a duration determined by and determining the extent of permissible variation of the measured linear dimension of the object 12, is fed to the other input of said combining unit. The combining unit 57 may comprise any suitable means for combining the positive and negative pulses supplied thereto and for providing an output pulse when the duration of the positive pulse is greater or less than the duration of the negative pulse by a predetermined amount and for providing an output signal of one polarity when the duration of the positive pulse exceeds that of the negative pulse and of the other polarity when the duration of the negative pulse exceeds that of the positive pulse. Thus, for example, the combining unit 57 may comprise an adder of any suitable known type which functions to compare the positive pulse fed into one input thereof and the negative reference pulse fed into the other input thereof, to produce a positive polarity output pulse when the duration of the positive pulse is greater than the duration of the negative pulse and to produce a negative polarity output pulse when the duration of the positive pulse is less than the duration of the negative pulse. The output or resulting control pulse therefore has a positive or negative polarity depending upon whether the control pulse of the camera output signal, and thus the measured length of the selected linear dimension of the object 12, is without or within the desired limits or permissible extent of variation of said dimension. Thus, for example, the positive polarity pulse produced by the output of the combining unit 57 may indicate that the extent of overlap or underlap from the desired reference length is within or at the imposed limitations thereon, so that the positive pulse is narrower than or equal to the negative pulse provided by the multivibrator and the negative polarity pulse of said combining unit may indicate that the extent of overlap or underlap exceeds the imposed limitations thereon.

In other words, if the measured linear dimension is greater or less than the desired reference length and if the variation or extent of deviation of the measured dimension is beyond the imposed limitations thereon, the positive pulse supplied to the combining unit 57 is of greater duration than the negative reference pulse supplied thereto and the output of said combining unit is a positive pulse. In the event that the measured linear dimension is greater or less than the desired reference length to an extent wherein the extent of deviation is within the selected imposed limitations thereon then the width or pulse duration of the positive pulse is less than the duration of the negative reference pulse and the output of the combining unit 57 is a negative pulse.

The resultant control pulse of positive or negative polarity provided by the combining unit 57 is supplied to a control unit 58. The control unit 58 may comprise any suitable means for controlling any desired operation on the object 12. Thus, for example, the control unit 58 may be utilized to vary the diameter of the object 12 in accordance with whether said control unit is actuated or not. In this manner, the operation control unit 40 may provide a completely automatic control of the diameter of the object 12 in order to maintain said diameter within predetermined desired limits. Thus, for example, the diameter of an object may be maintained at a set value of 108½ inches within a limitation of plus or minus ¼ of an inch, if so desired, by adjustment of the period of the multivibrator 55 of the reference pulse generator 52 to produce a reference pulse having a duration corresponding to 108¼ to 108¾ inches thereby to maintain said imposed limitations of ¼ of an inch.

A suitable control unit 58 may comprise any suitable power means, such as, for example, a thyratron unit 59, as shown in FIG. 8, which is connected to the output of the combining unit 57 and which is energized in accordance with a pulse of that polarity which indicates that the measured linear dimension of the object exceeds the selected imposed limitations thereupon. A relay unit 61 is connected to the thyratron unit 59 and is operated upon energization of said thyratron unit to control an alarm or control unit 62, which may either control an operation as aforementioned, or may actuate an alarm to signal that the measured linear dimension varies to an extent beyond the desired limitations thereof.

If the control pulse derived from the selector 47 is equal to or narrower than the reference pulse produced by the multivibrator, that is, within the selected limitations, the output of the combining unit 57 is zero or negative. If said control pulse is wider or of greater duration than the pulse of the multivibrator, that is, beyond the selected limitations, the output of the combining unit is a positive pulse. The output of the combining unit 57 is fed to the grid of the thyratron unit 59 which is triggered by a pulse of positive polarity. Triggering of the thyratron results in energizing of the relay unit 61 which is connected to the plate circuit of said thyratron and actuates the control circuit or the alarm. The positive spike provided at the output of the integrator 53 is utilized to trigger the monostable multivibrator 55 which then produces the negative reference pulse.

FIG. 9 is another embodiment of the dimension measuring arrangement of the present invention and is specifically adapted to measure the width *w* of an object, such as the object 71. The optical director of the embodiment of FIG. 7 comprises a pair of mirrors in side by side relation so that only one thereof is shown in the drawing; the other thereof being directly behind said one thereof. The first mirror constitutes a first optical director 72 and the second mirror constitutes a second optical director 73. The first optical director 72 functions to direct an image of half the width of the object 71 into the camera 74 and thereby to present such image of half said object along the width thereof on the viewing screen of the television monitor 75 connected to said camera.

The second optical director 73 serves to direct a second image of half the width of said object thereby to provide a second image of half said object along the width thereof on the viewing screen of the monitor 75 adjacent the first image. Thus, for example, the first optical director 72 may serve to direct an image of half the width of the object 71 from the center *c* thereof to the left end of the width thereof and the second optical director 73 may serve to direct a second image of half the object 71 from the center *c* thereof to the right end of the width thereof, thereby providing two half images of said object on the viewing screen of the television monitor. The first and second half images on the television monitor 75 appear adjacent each other and together provide an image of the whole object 71.

The extent of rotation of the first optical director 72 plus the extent of rotation of the second optical director 73, between the limits of the center of the width of the object 71 and each edge thereof, thus indicates the width *w* of said object. Therefore, in order to measure the width of the object 71 directly, a first moving control 76 is mechanically coupled to the first optical director 72 and functions to rotate said first optical director and a second moving control 77 is mechanically coupled to the second optical director 73 and functions to rotate said second optical director. The rotation of each of said first and second optical directors is such as to provide normal scanning along the width *w* of the object 71. The first and second moving controls 76 and 77 may comprise any suitable moving means for rotating the first and second optical directors, such as, for example, motors and suitable coupling and/or gear means, and each of said first and second moving controls is coupled to a rotation indicator 78.

The rotation indicator 78 indicates the extent of the total rotation of the first and second moving controls 76 and 77, thereby indicating the width *w* of the object 71. The rotation indicator 78 may comprise any suitable means for measuring the extent of rotation of the first and second optical directors 72 and 73 and thus may comprise any suitable gear means for providing signals corresponding to the number of rotations of the coupling means between the first and second moving controls 76 and 77 and said first and second optical directors, respectively. The indication of the rotation indicator 78 is thus an indication of the width *w* of the object 71.

A suitable power supply 79 is connected to the camera 74 and the monitor 75 in the manner of FIG. 1, and serves, in the manner of FIG. 1, to energize the camera and monitor to permit operation of the arrangement of FIG. 9.

Similarly to the arrangement of FIG. 1, the arrangement of FIG. 9 may be utilized to compare a measured length of a selected linear dimension, such as the width *w* of the object 71, with a desired reference length for such width. Thus, the arrangement of FIG. 9 may be operated in a similar manner to the arrangement of FIG. 1 to indicate the extent of deviation between a measured width and a desired width and may also function in a manner similar to that of FIG. 1 to provide an automatic control function in accordance with the deviation between a measured width and a desired width. Thus, the camera output signal derived from the camera 74 may be supplied to an indicator 81 which is similar to the indicator 38 of FIG. 1 and the output of the indicator 38 may be supplied to a recorder 81 which is similar to the recorder 39 of FIG. 1. The camera output signal of the camera 74 may also be supplied to an operation control unit 83 which is similar to the operation control unit 40 of the embodiment of FIG. 1 and functions in a similar manner thereto and provides a similar result thereto.

It is thus seen that the embodiments of FIG. 1 and FIG. 9 function in a manner whereby a selected linear dimension, such as a diameter or a width, of an object may be measured directly, may be compared to a desired magnitude of such selected linear dimension, and may be utilized to control an operation in accordance with the comparison thereof with a desired magnitude thereof.

The optical director 16 of FIG. 1 may comprise an optical wedge. This may comprise, for example, an achromatic optical wedge with a hole through the center. It is so designed that rotation of the wedge displaces the image of the object 12 through the wedge away from the image of the object 12 viewed through the hole in the wedge in such a manner that the bottom of the image 12 viewed through the wedge may be brought into contact with the top of the image viewed through the hole through the wedge. The camera 11 sees the object 12 directly through the hole through the wedge and it also sees the object through the wedge itself. The wedge is rotated until the first and second images which are initially coincident, are in relation to each other as indicated in FIG. 3*a*. The amount of rotation of the wedge is a direct indication of the diameter or selected linear dimension of the object 12.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A dimension measuring arrangement for measuring a selected linear dimension of an object comprising, in combination, television camera means positioned in operative proximity to said object and adapted to produce a camera output signal including a blanking pulse and a control pulse; television monitor means having a viewing screen and being connected to said camera means with the camera output signal of said camera means supplied to said monitor means to provide on the viewing screen of said monitor means the image of an object seen by said camera means; optical directing means for directing into said camera means a first image of said object and for directing into said camera means a second image of said object in a predetermined relation to said first image representing a desired reference length of the selected linear dimension of said object, the width of the control pulse of said camera output signal indicating the extent of a deviation of the selected linear dimension of said object from said desired reference length; indicating means for converting the control pulse of said camera output signal to an indication of the extent of deviation of the selected linear dimension of said object from said desired reference length, said indicating means comprising input means connected to said camera means for suppressing the blanking pulse of said camera output signal and for passing the control pulse of said camera output signal, converter means connected to said input means for converting the control pulse passed by said input means into an output voltage having a magnitude corresponding to the width of said control pulse and therefore to the extent of the deviation of the selected linear dimension of said object from said desired reference length and a polarity indicating the direction of the deviation of the selected linear dimension of said object from said desired reference length, and meter means connected to said converter means for indicating the magnitude and polarity of said output voltage and therefore the extent and direction of the deviation of the selected linear dimension of said object from said desired reference length.

2. A dimension measuring arrangement for measuring a selected linear dimension of an object comprising, in combination, television camera means positioned in operative proximity to said object and adapted to produce a camera output signal including a blanking pulse and a control pulse; television monitor means having a viewing screen and being connected to said camera means with the camera output signal of said camera means supplied to said monitor means to provide on the viewing screen of said monitor means the image of an object seen by said camera means; optical directing means for directing into said camera means a first image of said object and for directing into said camera means a second image of said object in a predetermined relation to said first image representing a desired reference length of the selected linear dimension of said object, the width of the control pulse of said camera output signal indicating the extent of a deviation of the selected linear dimension of said object from said desired reference length; and operation control means for converting the control pulse of said camera output signal to an operation control in accordance with the extent and direction of deviation of the selected linear dimension of said object from said desired reference length, said operation control means comprising input means connected to said camera means for suppressing the blanking pulse of said camera output signal and for passing the control pulse of said camera output signal, selector means connected to said input means for converting the control pulse passed by said input means into a positive output pulse having the same width as said control pulse, reference pulse generating means connected to said selector means for providing a negative reference pulse having a width corresponding to selected desired limits of the selected linear dimension of said object, combining means connected to said selector means and to said reference pulse generating means for combining the positive output pulse provided by said selector means with the negative reference pulse provided by said reference pulse generating means to produce a resultant control pulse having a polarity indicating the relation between the selected linear dimension of said object and the selected desired limits of said selected linear dimension of said object, and control means connected to said combining means and adapted to be operated by a resultant control pulse of predetermined polarity.

3. A dimension measuring arrangement for measuring a selected linear dimension of an object comprising, in combination, television camera means positioned in operative proximity to said object and adapted to produce a camera output signal including a blanking pulse and a control pulse; television monitor means having a viewing screen and being connected to said camera means with the camera output signal of said camera means supplied to said monitor means to provide on the viewing screen of said monitor means the image of an object seen by said camera means; optical directing means for directing into said camera means a first image of said object and for directing into said camera means a second image of said object in a predetermined relation to said first image representing a desired reference length of the selected linear dimension of said object, the width of the control pulse of said camera output signal indicating the extent of a deviation of the selected linear dimension of said object from said desired reference length; and operation control means for converting the control pulse of said camera output signal to an operation control in accordance with the extent and direction of deviation of the selected linear dimension of said object from said desired reference length, said operation control means comprising input means connected to said camera means for suppressing the blanking pulse of said camera output signal and for passing the control pulse of said camera output signal, selector means connected to said input means for converting the control pulse passed by said input means into a positive output pulse having the same width as said control pulse, reference pulse generating means connected to said selector means for providing a negative reference pulse having a width corresponding to selected desired limits of the selected linear dimension of said object, said reference pulse generating means comprising monostable multivibrator means including means for adjusting said multivibrator means to produce a reference pulse having a width corresponding to the selected desired limits of said selected linear dimension of said object, combining means connected to said selector means and to said reference pulse generating means for combining the positive output pulse provided by said selector means with the negative reference pulse provided by said reference pulse generating means to produce a resultant control pulse having a polarity indicating the relation between the selected linear dimension of said object and the selected desired limits of said selected linear dimension of said object, and control means connected to said combining means and adapted to be operated by a resultant control pulse of predetermined polarity.

4. A dimension measuring arrangement for measuring a selected linear dimension of an object comprising, in combination, television camera means positioned in operative proximity to said object and adapted to produce a camera output signal; television monitor means having a viewing screen and being connected to said camera means with the camera output signal of said camera means supplied to said monitor means to provide on the viewing screen of said monitor means the image of an object seen by said camera means; optical directing means for directing into said camera means a first image of said object to provide a first image of said object on the viewing screen of said monitor means, said optical directing means being adapted to be rotated to direct into said camera means a second image of said object thereby providing a second image of said object on the viewing screen of said monitor means in a predetermined relation to said first image; moving means coupled to said optical directing means for rotating said optical directing means to provide said second image of said object on the viewing screen of said monitor means; and rotation indicating means coupled to said moving means for indicating the amount of rotation of said optical directing means between the positioning of said first image and the positioning of the second image of said object in said predetermined position in relation to said first image on the viewing screen of said monitor means, said amount of rotation of said optical directing means corresponding to the length of the selected linear dimension of said object.

5. A dimension measuring arrangement for measuring the diameter of an object comprising, in combination, television camera means positioned in operative proximity to said object and adapted to produce a camera output signal; television monitor means having a viewing screen and being connected to said camera means with the camera output signal of said camera means supplied to said monitor means to provide on the viewing screen of said monitor means the image of an object seen by said camera means; optical directing means for directing into said camera means a first image of said object to provide a first image of said object on the viewing screen of said monitor means, said optical directing means being adapted to be rotated to direct into said camera means a second image of said object thereby providing a second image of said object on the viewing screen of said monitor means in a predetermined relation to said first image; moving means coupled to said optical directing means for rotating said optical directing means to provide said second image of said object on the viewing screen of said monitor means; and rotation indicating means coupled to said moving means for indicating the amount of rotation of said optical directing means between the positioning of said first image and the positioning of the second image of said object in said predetermined position in relation to said first image on the viewing screen of said monitor means, said amount of rotation of said optical directing means corresponding to the diameter of said object.

6. A dimension measuring arrangement for measuring the width of an object comprising, in combination, television camera means positioned in operative proximity to said object and adapted to produce a camera output signal; television monitor means having a viewing screen and being connected to said camera means with the camera output signal of said camera means supplied to said monitor means to provide on the viewing screen of said monitor means the image of an object seen by said camera means; first optical directing means adapted to be rotated to direct into said camera means a first image of half said object along the width of said object to provide a first image of half said object along the width of said object on the viewing screen of said monitor means; second optical directing means adapted to be rotated to direct into said camera means a second image of half said object along the width of said object to provide a second image of half said object along the width of said object adjacent said first image on the viewing screen of said monitor means; first moving means coupled to said first optical directing means for rotating said first optical directing means to provide said first image of half said object along the width of said object on the viewing screen of said monitor means; second moving means coupled to said second optical directing means for rotating said second optical directing means to provide said second image of half said object along the width of said object on the viewing screen of said monitor means; and rotation indicating means coupled to said first and second moving means for indicating the amount of rotation of said first and second optical directing means, the amount of rotation of said first and second optical directing means corresponding to the width of said object.

References Cited by the Examiner

UNITED STATES PATENTS

| | | | |
|---|---|---|---|
| 2,670,650 | 3/54 | Wilmotte | 88—14 |
| 2,674,915 | 4/54 | Anderson | 178—6 |
| 2,955,155 | 10/60 | Mayer | 178—6 |

DAVID G. REDINBAUGH, *Primary Examiner.*

ROY LAKE, *Examiner.*